US012726847B2

(12) United States Patent
Rofougaran et al.

(10) Patent No.: US 12,726,847 B2
(45) Date of Patent: Sep. 1, 2026

(54) WIRELESS COMMUNICATION SYSTEM AND METHOD OF WIRELESS COMMUNICATION IN A WIRELESS BACKHAUL NETWORK

(71) Applicant: AR & NS Investment, LLC, Newport Coast, CA (US)

(72) Inventors: Ahmadreza Rofougaran, Newport Beach, CA (US); Arman Rofougaran, Newport Coast, CA (US); Milan Rofougaran, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 208 days.

(21) Appl. No.: 18/748,151

(22) Filed: Jun. 20, 2024

(65) Prior Publication Data

US 2025/0392946 A1 Dec. 25, 2025

(51) Int. Cl.
*H04W 28/02* (2009.01)
*H04W 16/26* (2009.01)
*H04W 84/04* (2009.01)

(52) U.S. Cl.
CPC ....... *H04W 28/0236* (2013.01); *H04W 16/26* (2013.01); *H04W 84/047* (2013.01)

(58) Field of Classification Search
CPC H04W 28/0236; H04W 16/26; H04W 84/047
See application file for complete search history.

(56) References Cited

U.S. PATENT DOCUMENTS

| | | | | |
|---|---|---|---|---|
| 6,404,775 | B1 * | 6/2002 | Leslie | H04B 7/2606 455/7 |
| 6,690,662 | B1 * | 2/2004 | Komara | H04W 88/085 375/350 |
| 9,628,955 | B1 * | 4/2017 | Rausch | H04H 20/02 |
| 12,150,050 | B1 * | 11/2024 | Rofougaran | H04W 52/0206 |
| 12,256,243 | B1 * | 3/2025 | Rofougaran | H04W 16/28 |
| 2002/0042290 | A1 * | 4/2002 | Williams | H04B 7/1555 455/562.1 |

(Continued)

FOREIGN PATENT DOCUMENTS

| | | | |
|---|---|---|---|
| CN | 101026807 A | * | 8/2007 |
| CN | 101119149 A | * | 2/2008 |

(Continued)

*Primary Examiner* — Michael A Keller
(74) *Attorney, Agent, or Firm* — CHIP LAW GROUP

(57) ABSTRACT

A wireless communication system includes a master wireless communication device, a plurality of intermediate repeater devices, and one or more service wireless communication devices. Each intermediate repeater device receives, from an upstream network node, a first RF carrier signal in a first frequency carrying a download data stream and further relays, the download data stream in a second RF carrier signal at a second frequency to a downstream network node. The second frequency is a first offset of the first frequency. Each intermediate repeater device further receives a third RF carrier signal carrying an upload data stream in a third frequency from a downstream network node and further communicates the upload data stream in a fourth RF carrier signal in a fourth frequency to the upstream network node. The fourth frequency is a second offset of the third frequency.

20 Claims, 6 Drawing Sheets

(56) References Cited

U.S. PATENT DOCUMENTS

| | | | | |
|---|---|---|---|---|
| 2002/0065094 | A1* | 5/2002 | Schmutz | H04B 7/2606<br>455/70 |
| 2006/0003695 | A1* | 1/2006 | Kennedy, Jr. | G01S 5/0273<br>455/456.1 |
| 2011/0034122 | A1* | 2/2011 | Kennedy, Jr. | H04W 64/00<br>455/7 |
| 2024/0129022 | A1* | 4/2024 | Rofougaran | H04B 7/15542 |

FOREIGN PATENT DOCUMENTS

| | | | | | |
|---|---|---|---|---|---|
| CN | 104067534 | A | * | 9/2014 | H04B 7/145 |
| CN | 111543119 | A | * | 8/2020 | H04B 7/18508 |
| JP | H02150849 | U | * | 12/1990 | |
| KR | 20080017006 | A | * | 2/2008 | H04B 3/56 |
| WO | WO-0178249 | A1 | * | 10/2001 | H04L 1/243 |
| WO | WO-2025091056 | A1 | * | 5/2025 | F42D 1/055 |

* cited by examiner

400

Communicate, by a master wireless communication device, with a data source and one of the plurality of intermediate repeater devices 402

Communicate, by each of plurality of intermediate repeater devices, with an upstream network node and a downstream network node 404

Communicate, by one or more service wireless communication devices, with one or more intermediate repeater devices of the plurality of intermediate repeater devices and one or more user equipment (UEs) 406

Control, by master wireless communication device, the plurality of intermediate repeater devices, and the one or more service wireless communication devices to form a wireless radio frequency (RF) mesh network in a sub-9 Gigahertz (GHz) frequency range in a defined physical area 408

Perform, by master wireless communication device, an environmental scan to detect existing frequency usage in the defined physical area 410

Determine, by master wireless communication device, a set of frequencies and bandwidths available for communication within the defined physical area within the sub-9 GHz frequency range based on the environmental scan 412

Form, by the master wireless communication device, a dual-link data backhaul among the master wireless communication device and the one or more service wireless communication devices in a frequency range of 5-8 GHz in the wireless RF mesh network 414

Re-configure, by the master wireless communication device, the master wireless communication device and the one or more service wireless communication devices to operate on the determined set of frequencies and bandwidths within the sub-9 GHz frequency range to form the dual-link data backhaul 416

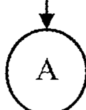

FIG. 4A

Form, by the master wireless communication device, a backhaul management link among the master wireless communication device and the one or more service wireless communication devices in a frequency range less than the frequency range of 5-8 GHz in the wireless RF mesh network 418

Concurrently perform, by the master wireless communication device, a transmit operation (Tx) and receive operation (Rx) at different frequency bands with a first wireless service device of the one or more service wireless communication devices via the dual-link data backhaul 420

Receive, by each intermediate repeater device, a first RF carrier signal in a first frequency carrying a download data stream from the upstream network node 422

Relay, by each intermediate repeater device, the download data stream in a second RF carrier signal at a second frequency to the downstream network node, wherein the second frequency is a first offset of the first frequency 424

Receive, by each intermediate repeater device, a third RF carrier signal carrying an upload data stream in a third frequency from the downstream network node 426

Communicate, by each intermediate repeater device, the upload data stream in a fourth RF carrier signal in a fourth frequency to the upstream network node, wherein the fourth frequency is a second offset of the third frequency 428

Periodically monitor, by the master wireless communication device, a user demand at a plurality of different sub-areas distributed in the defined physical area using the one or more service wireless communication devices 430

FIG. 4B

WIRELESS COMMUNICATION SYSTEM AND METHOD OF WIRELESS COMMUNICATION IN A WIRELESS BACKHAUL NETWORK

CROSS-REFERENCE TO RELATED APPLICATIONS/INCORPORATION BY REFERENCE

None

FIELD OF TECHNOLOGY

Certain embodiments of the disclosure relate to a wireless communication system for fixed wireless access (FWA). More specifically, certain embodiments of the disclosure relate to a wireless communication system and method of wireless communication in a wireless backhaul network.

BACKGROUND

Conventional communication devices, such as a wireless access point (WAP), are often used to extend the wireless coverage of an existing Wi-Fi signal to access the Internet and to increase the number of end devices (users) capable of using Wi-Fi® that may connect to the WAP. However, Wi-Fi® signals, by the limitation of the Wi-Fi® communication protocol, have a defined range beyond which the connectivity is lost. Thus, many WAPs or range extenders are used if wireless coverage for Wi-Fi® signals is to be extended. Moreover, under ideal conditions, typically, 2.4 GHz Wi-Fi® supports up to 450 Mbps or 600 Mbps, and 5 GHz Wi-Fi® supports up to 1300 Mbps. Thus, the data transmission over such a narrow bandwidth is much lower than higher radio frequencies. In the case of Bluetooth network, the coverage and data transmission rate are even much less than conventional Wi-Fi® network.

Currently, certain communication devices, such as Internet-of-Things (IoT) devices depend on high-speed Internet access to the cloud to send sensor data and receive instructions (e.g. artificial intelligence-based processing models) from cloud either directly or via a gateway device. The number of wireless sensors and IoT devices are rapidly increasing with the increase in smart homes, smart offices, enterprises, etc. Existing communication systems and Wi-Fi® standards are unbale to handle such a massive number of wireless sensors and IoT devices and their quality-of-service (QoS) requirements. Moreover, latency and signal noise due to interference are other technical problem with existing communication systems and network architecture when operating in a sub 6 GHz frequency, and such latency increases when more wireless access points or relay nodes are introduced in the network to extend the communication range.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A wireless communication system and a method of wireless communication in a wireless backhaul network, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 4A, FIG. 4B and FIG. 4C, collectively, is a flowchart that illustrates an exemplary method of wireless communication in a wireless backhaul network, in accordance with an embodiment of the disclosure.

DETAILED DESCRIPTION OF THE DISCLOSURE

Certain embodiments of the disclosure may be found in a wireless communication system and a method of wireless communication in a wireless backhaul network.

Conventional wireless local area mesh networks, such as Wi-Fi® access points-based mesh networks or distributed Wi-Fi mesh nodes may be used to extend wireless network coverage. However, it is observed that access points (AP's) too far apart can lead to poor connectivity as a result of, for example, a weak signal strength. Currently, it is observed that conventional mesh networks not only introduce additional latency due to multiple hops between access points but also adding more access points leads to increased signal overlaps and signal interference. As the signal passes through multiple nodes, the effective range and quality of the connection may decrease, impacting overall network performance. Further, conventional radio frequency mesh networks typically have a backhaul link that connects nodes to the main network. If this link is not robust enough, it can become a bottleneck, affecting the performance of the entire mesh.

In contrast to the conventional systems, the wireless communication system and method of the present disclosure not only improves data transfer rates between the wireless communication system and user equipment (UEs) as compared to existing wireless systems (e.g. conventional wireless local area networks) but also enables almost near zero latency communication and an always-connected experience. The wireless communication system significantly increases bandwidth while reducing (or even removing) signal noise and achieving almost near-zero latency for high-performance data communication. The wireless communication system 102 employs an intelligent frequency offset strategy for concurrent download and upload data streams for managing oscillation in full-duplex wireless systems, irrespective of operation at lower frequencies, for example, sub-9 GHz frequencies. By using different carrier frequencies for download and upload transmissions, a wireless backhaul network in the wireless communication system may operate efficiently without the need for complex scheduling mechanisms. This frequency offset allows not only parallel data transfer via a dual-link data backhaul but significantly reduces signal noise and interference enhancing the system's throughput and reducing latency. In the following description, reference is made to the accompanying drawings, which form a part hereof, and in which are shown, by way of illustration, various embodiments of the present disclosure.

Figure 1:
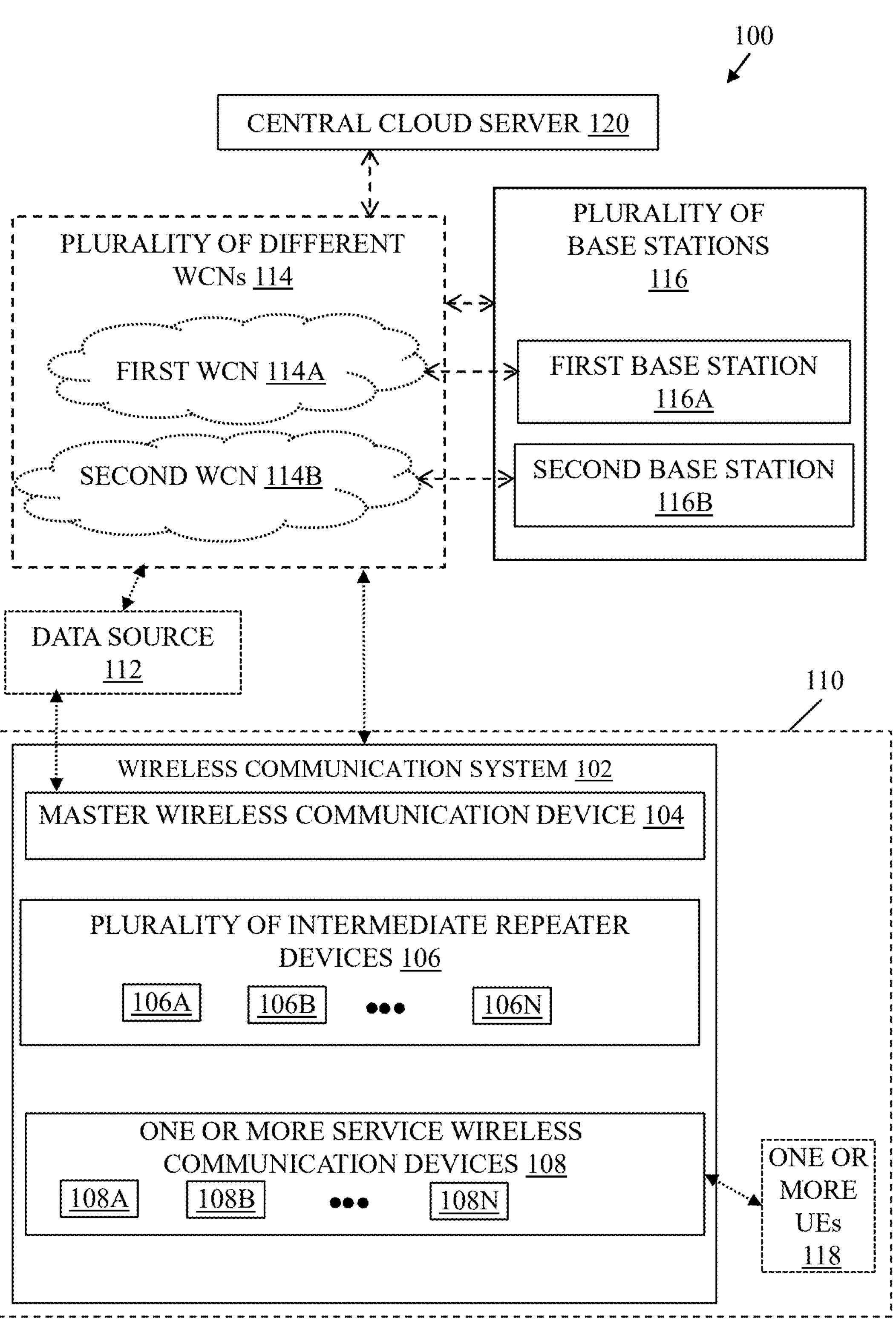
FIG. 1 is a diagram illustrating a network environment of an exemplary wireless communication system, in accordance with an exemplary embodiment of the disclosure.

FIG. 1 is a diagram illustrating a network environment of an exemplary wireless communication system, in accordance with an exemplary embodiment of the disclosure. With reference to FIG. 1, there is shown a network environment 100 of a wireless communication system 102. The wireless communication system 102 may include a master wireless communication device 104, a plurality of intermediate repeater devices 106 (e.g., intermediate repeater devices 106A, 106B, . . . , 106N), and one or more service wireless communication devices 108 (e.g., service wireless communication devices 108A, 108B, . . . , 108N). Each of the master wireless communication device 104, the plurality of intermediate repeater devices 106, and the one or more service wireless communication devices 108 may be deployed at different locations and may be distributed in a wireless backhaul network 110 (may also be referred to as a wireless radio frequency (RF) mesh network). There is further shown a plurality of base stations 116 (e.g., a first base station 116A and a second base station 116B), a plurality of different wireless carrier networks (WCNs) 114 (e.g., a first WCN 114A and a second WCN 114B), one or more user equipment (UEs) 118, and a central cloud server 120.

In an implementation, the wireless communication system 102 may be communicatively coupled to the central cloud server 120. In another implementation, the central cloud server 120 may be a part of the wireless communication system 102 and may remotely control the master wireless communication device 104 and the plurality of intermediate repeater devices 106. The one or more UEs 118 may be present in the wireless backhaul network 110. There is further shown a data source 112 connected to the master wireless communication device 104.

The master wireless communication device 104 includes suitable logic, circuitry, and interfaces that may be configured to provide access to the Internet or wireless backhaul in 5G or 6G networks. The master wireless communication device 104 may also be called a master access point or a master network node. Examples of the master wireless communication device 104 may include but are not limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, or a network security device, or one or more combinations thereof. The master wireless communication device 104 (from the master Access Point's (AP's) perspective) may be responsible for downloading and uploading data, for example, with a broader communication network (e.g., an ISP modem), such as the data source 112. The download and upload frequency may differ so that when the master wireless communication device 104 transmits, then the one or more service wireless communication devices 108 may not be required to listen at that frequency like the conventional systems.

Each of the plurality of intermediate repeater devices 106 may be disposed at a plurality of different locations. The plurality of intermediate repeater devices 106 may be disposed as a radio frequency (RF) bridge between the master wireless communication device 104 and the one or more service wireless communication devices 108. The plurality of intermediate repeater devices 106 extends the coverage area of the master wireless communication device 104 and one or more service wireless communication devices 108, allowing them to serve its corresponding UEs in areas with poor signal reception.

Each of the one or more service wireless communication devices 108 may be configured to communicate with the one or more intermediate repeater devices 106 as well as the one or more UEs 118. Each of the one or more service wireless communication devices 108 may also be referred to as a service network node, a service node, a service node, a service wireless access point, and the like. Examples of implementation of each of the one or more service wireless communication devices 108 may include, but is not limited to, a wireless access point, a repeater device, a mesh network node, or a combination thereof. Each service wireless communication device may be strategically deployed to meet specific network requirements, which ensures that each service wireless communication device may be tailored to optimize performance, coverage, and functionality, making each network node highly adaptable to various use cases and evolving network needs.

The wireless backhaul network 110 may be formed among the master wireless communication device 104, the plurality of intermediate repeater devices 106, and the one or more service wireless communication devices 108. The wireless backhaul network 110 may be wireless network that uses radio waves to connect various access points (e.g., the master wireless communication device 104 and the one or more service wireless communication devices 108 via the plurality of intermediate repeater devices 106) to the core network or the internet. It serves as a wireless alternative to traditional wired backhaul solutions that rely on fiber-optic cables. The master wireless communication device 104 may be configured to control the plurality of intermediate repeater devices 106 and the one or more service wireless communication devices 108 to form the wireless backhaul network 110 in a sub-9 Gigahertz (GHz) frequency range in a defined physical area (e.g., a modified and improved Wi-Fi® 7 or 8 mesh network).

In an implementation, the data source 112 may be an optical fiber for the Internet connection, an Ethernet cable for the Internet connection, or a 5G or 6G mmWave cellular signal received from a radio access network (RAN) node, such as the first base station 116A of the first WCN 114A or the second base station 116B of the second WCN 114B.

Each of the plurality of different WCNs 114 may be owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 114 may own or control elements of a network infrastructure to provide services to its subscribers over the licensed spectrum, for example, 4G LTE, or 5G spectrum (FR1 or FR2). For example, the first base station 116A may be controlled, managed, or associated with the first WCN 114A, and the second base station 116B may be controlled, managed, or associated with the second WCN 114B different from the first WCN 114A. The plurality of different WCNs 114 may also include mobile virtual network operators (MVNO).

Each of the plurality of base stations 116 may be a fixed point of communication that may communicate information, in the form of a plurality of beams of RF signals, to and from communication devices, such as the wireless communication system 102 and the one or more UEs 118. Multiple base stations corresponding to one service provider, may be geographically positioned to cover specific geographical areas. Typically, bandwidth requirements serve as a guideline for a location of a base station based on the relative distance between the UEs and the base station. The count of base stations depends on population density and geographic irregularities, such as buildings and mountain ranges, which may interfere with the plurality of beams of RF signals. In an implementation, each of the plurality of base stations 116 may be a gNB. In another implementation, the plurality of base stations 116 may include eNBs, Master eNBs (MeNBs) (for non-standalone mode), and gNBs.

Each of one or more UEs 118 may correspond to a wireless device, such as a client device or a telecommunication hardware used by an end-user to communicate. Some of the one or more UEs 118 may refer to a combination of a mobile equipment and subscriber identity module (SIM). Examples of the one or more UEs 118 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The central cloud server 120 includes suitable logic, circuitry, and interfaces that may be configured to communicate with the wireless communication system 102. In an example, the central cloud server 120 may be a remote management server that may be managed by a third party different from the service providers associated with the plurality of different WCNs 114. In another example, the central cloud server 120 may be a remote management server or a data center that may be managed by a third party, or jointly managed, or managed in coordination and association with one or more of the plurality of different WCNs 114. In an implementation, the central cloud server 120 may be a master cloud server or a master machine that may be a part of a data center that controls an array of other cloud servers communicatively coupled to it, for load balancing, running customized applications, and efficient data management.

Typically, conventional communication networks (e.g., wired networks) are inefficient in handling a massive number of wireless sensors and IoT devices and corresponding quality-of-service (QoS) requirements. Moreover, latency and signal noise are other technical problems with the conventional communication systems and network architecture when operating in a sub 6 GHz frequency, and such latency increases when more wireless access points or relay nodes are introduced in the network to extend the communication range. Currently, in WLAN technology, the 2.4 GHz and 5 GHz frequency bands are unlicensed spectrums that are limited and congested. When running high-bandwidth applications, existing Wi-Fi networks inevitably encounter low quality of service (QoS). More advanced WLAN technology, like the IEEE 802.11be (Wi-Fi® 7) may be being developed with higher data rate capability, such as theoretical capacity of up to 30 Gbps (e.g., assuming ideal conditions like clear line-of-sight, single user, and no interference).

In comparison, 5-10 Gbps may be a more realistic expectation in practical scenarios. Many factors affect practical capacity, such as signal interference from nearby devices, appliances, and weather, which can disrupt signals, reducing throughput. In another example, distance from the access point may be also another factor where signal strength weakens with distance, impacting achievable speeds. Further, collision avoidance in wireless networks may be a significant problem, especially with traditional wireless mesh networks and WLAN systems. Typically, collisions occur when multiple devices attempt to transmit data concurrently on a shared wireless channel, resulting in corrupted data and reduced network performance.

In operation, the master wireless communication device 104 may communicate with the data source 112 and the plurality of intermediate repeater devices 106. The master wireless communication device 104 may be configured to control the plurality of intermediate repeater devices 106 and the one or more service wireless communication devices 108 to form the wireless backhaul network 110 in a sub-9 Gigahertz (GHz) frequency range in a defined physical area (e.g., an improved Wi-Fi® RF mesh network that includes the plurality of intermediate repeater devices 106 between the master wireless communication device 104 and the one or more service wireless communication devices 108). The master wireless communication device 104 may be further configured to form a dual-link data backhaul among the master wireless communication device 104, the plurality of intermediate repeater devices 106 and the one or more service wireless communication devices 108 in a frequency range of 5-8 GHz in the wireless backhaul network 110 in the defined physical area. The dual-link data backhaul may be a special-purpose backhaul that comprises two dedicated RF wireless links operating in parallel, specifically designed to handle upstream and downstream traffic independently. For example, the dual-link data backhaul may include an upstream data link for upload configured to send data from the one or more UEs 118 via a network path back to the core network (e.g., user data from the one or more UEs 118 to the one or more service wireless communication devices 108 followed by the plurality of intermediate repeater devices 106 to the master wireless communication device 104 and further to the data source 112). The dual-link data backhaul may further include a downstream data link for data download configured to receive data from the core network (via the data source 112) and deliver to the one or more UEs 118 via another network path to master wireless communication device 104 to the plurality of intermediate repeater devices 106 to one or more service wireless communication devices 108 to the one or more UEs 118). The master wireless communication device 104 and each of the plurality of intermediate repeater devices 106 may be further configured to concurrently perform a transmit operation (Tx) and receive operation (Rx) at different frequency bands with a neighboring network node via the dual-link data backhaul.

Each intermediate repeater device of the plurality of intermediate repeater devices 106 may be configured to communicate with an upstream network node and a downstream network node. The upstream network node may be one of the master wireless communication device 104 or an upstream intermediate repeater device of the plurality of intermediate repeater devices 106. The downstream network node may be one of a downstream intermediate repeater device of the plurality of intermediate repeater devices 106 or the first service wireless communication device 108A of the one or more service wireless communication devices 108. The communication between each pair of the plurality of intermediate repeater devices 106 may be in different intermediate frequencies (e.g., different mmWave frequencies or other intermediate frequencies). The transmit and receive on the different intermediate frequencies may be performed to make a static and permanent wireless backhaul connection with minimum or almost no interference and further where the dual-link data backhaul may not be subjected to dynamic changes by Wi-Fi protocol requirements, for example, changes in Modulation and Coding Scheme (MCS) data transfer rates. This enables the wireless communication system 102 to keep the wireless backhaul network 110 (i.e., node to node communication) fixed and undisturbed.

Each service wireless communication device of the one or more service wireless communication devices 108 may communicate with the plurality of intermediate repeater devices 106 and the one or more UEs 118. The one or more service wireless communication devices 108 may be wireless access devices that directly communicate with end-user devices such as the one or more UEs 118.

Each intermediate repeater device of the plurality of intermediate repeater devices 106 may be configured to receive a first RF carrier signal in a first frequency carrying a download data stream from the upstream network node (e.g., the master wireless communication device 104 or an upstream intermediate repeater device) and relay the download data stream in a second RF carrier signal at a second frequency to a downstream network node (e.g., a downstream intermediate repeater device). The second frequency may be a first offset of the first frequency. Further, each intermediate repeater device may be configured to receive a third RF carrier signal carrying an upload data stream in a third frequency from the downstream network node and further communicate the upload data stream in a fourth RF carrier signal in a fourth frequency to the upstream network node (e.g., the master wireless communication device 104 or an upstream intermediate repeater device). In this case too, the fourth frequency may be a second offset of the third frequency. In other words, all the four frequencies to receive and transmit at the donor side as well as relay side for each of the upstream data link and the downstream data link may be different. Alternatively stated, the master wireless communication device 104 (i.e., the Master Access Point (AP)) may be configured to transmit signals at “RF1” and receive signals at “RF4”. Each intermediate repeater device (i.e., each relay) may receive at “RF1” and transmit at “RF2” for the download process and receive at “RF3” and transmit at “RF4” for the upload process. Lastly, the service wireless communication device (i.e. the service AP) may be configured to transmit at “RF3” and receive at “RF2”. This serves to isolate all the signals and prevent the feedback loop that would normally occur if RF3 leaked back into RF4. Since the leaked RF3 would now be outside the filter’s passband, it may be effectively attenuated, helping prevent oscillation. For example, if RF1=6 GHz, offset (Delta F) may be 200 MHz: This would lead to RF2=6.2 GHz, i.e., 200 MHZ, likely outside filter bandwidth.

Thus, the wireless communication system 102 employs a frequency offset strategy for concurrent download and upload data streams for managing oscillation in full-duplex wireless systems, irrespective of lower frequencies, for example, sub-9 GHz frequencies. By using different carrier frequencies for download and upload transmissions, the wireless backhaul network 110 may operate efficiently without the need for time-division duplexing (TDD) or other complex scheduling mechanisms. This frequency offset allows not only parallel data transfer via the dual-link data backhaul but significantly reduces signal noise and interference enhancing the system’s throughput and reducing latency. It simplifies the network architecture while maintaining effective bidirectional communication between the upstream and downstream nodes. Each intermediate repeater device may have a donor side that may be opposite a relay side, each with its own antenna arrays. The use of separate antenna arrays for donor and relay functions enhances the efficiency of data transfer, reducing interference and optimizing the overall performance of the wireless backhaul network. In an example, the wireless backhaul network 110 may achieve multigigabit data throughput rates, for example, 40 to 100 Giga bits/second.

The scalability of the wireless backhaul network 110 may be independent of the fronthaul access network. The scalability may refer to the network’s ability to handle and support an increasing number of end-user devices or UEs or expand its coverage area. The wireless communication system 102 enables expanding or scaling the wireless backhaul network 110 without a direct impact on the fronthaul access, i.e., providing service to the one or more UEs 118 in the wireless backhaul network 110. Thus, the isolated wireless backhaul network (i.e., the wireless backhaul network 110) may be scaled independently of the fronthaul access and the master wireless communication device 104 may not interfere with or compete for resources with the traffic used for the fronthaul access, due to which no new collision domain may be introduced to the wireless backhaul network 110. The wireless communication system 102 leverages Wi-Fi® systems with intelligent modification and control in wireless communication for efficient network management. Furthermore, the wireless communication system 102 represents a significant advancement in indoor wireless networking, offering high efficiency, advanced control, and robust data handling capabilities.

Figure 2:
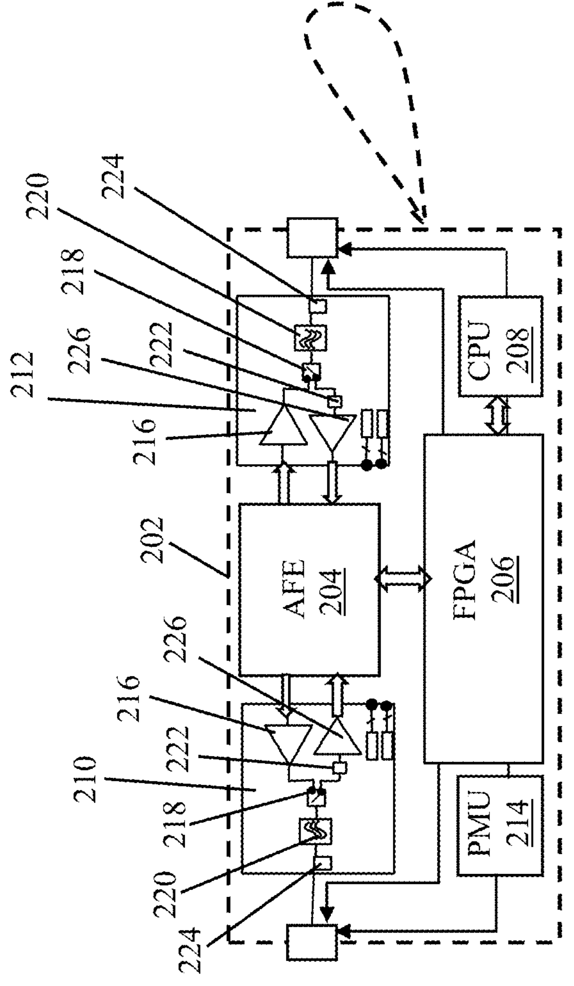
FIG. 2 is a diagram illustrating an exemplary communication core for a master wireless communication device, an intermediate repeater device, and a service wireless communication device, in accordance with an exemplary embodiment of the disclosure.

FIG. 2 is a diagram illustrating an exemplary communication core for a master wireless communication device, an intermediate repeater device, and a service wireless communication device, in accordance with an exemplary embodiment of the disclosure. FIG. 2 is explained in conjunction with elements from FIG. 1. With reference to FIG. 2, there is shown a communication core 202 for the master wireless communication device 104 and for service wireless communication device, such as the first service wireless communication device 108A. In an implementation, the communication core 202 may include a first analog front-end (AFE) 204, a field programmable gate array (FPGA) 206, and a central processing unit (CPU) 208. In this case, the communication core 202 may include two integrated RF front-end components, such as two power amplifier modules integrated duplexer (PAMiDs) components 210 and 212, each arranged at either side of the AFE 204. The communication core 202 may further include a phasor measurement unit (PMU) component 214. Each PAMID component 210 and 212 may include a power amplifier (PA) 216 connected to a transmit-receive switch (Tx-Rx SW) 218. The Tx-Rx SW 218 may be used to switch the PA 216 between transmit and receive modes. In each PAMID component 210 and 212, there is further shown a bandpass filter (BPF) 220 and a high-pass filter (HPF) 222 both connected to the Tx-Rx SW 218. The BPF 220 may be further connected to a coupling (CPL) component 224. The HPF 222 may be coupled to a low noise amplifier (LNA) 226.

In accordance with an embodiment, the AFE 204 may be an interface between the analogue RF signal and the digital processing components of the communication core 202. The AFE 204 may receive the signal from the PAMID component 210 or 212, may filter and digitize the received signals, and then may send the filtered or digitalized signals to the FPGA 206 and the CPU 208 for further processing. In an implementation, the AFE 204 will translate the RF to the original RF needed for different applications, such as the AFE 204 can be used as remote antennas to provide direct access.

In accordance with an embodiment, the FPGA 206 may be a programmable integrated circuit that allows for the customization of the digital signal processing operations (or algorithms) used in the communication core 202. The FPGA 206 along with the CPU 208 may be used to control the operation of the various components in the communication core 202 and for managing the flow of signals through the wireless communication system 102. In an example, the communication core 202 may be used by the master wireless communication device 104. In such example, the FPGA 206 along with the CPU 208 may be used for managing the flow of signals from the master wireless communication device 104 to the data source 112 and one of the plurality of intermediate repeater devices 106. In another example, the communication core 202 may be used by each service wireless communication device from the one or more service wireless communication devices 108. Therefore, in such example, the FPGA 206 along with the CPU 208 may be used for managing the flow of signal from the one or more service wireless communication devices 108 to communicate with the one or more intermediate repeater devices 106 and the one or more UEs 118 of FIG. 1.

In accordance with an embodiment, each PAMID component 210 and 212 may include the PA 216 that may amplify the signal power while the duplexer comprising of filters, Tx-Rx switches, and coupler allows for the simultaneous transmission and reception of the signal. The flow of signals through the communication core 202 may involve the captured RF signal from at least one of the plurality of different configurations of antennas being received and filtered by various components in the PAMID component 210. In the PAMID component 210, the signal after filtering may pass to the LNA 226 that may amplify the signal without adding additional noise before the signal is sent to the AFE 204 for processing. The signal may then be digitized by the AFE 204 (e.g., using an analogue to digital converter), processed by the controller (e.g., a digital signal processor, such as the FPGA 206 along with the CPU 208), passed back to the AFE 204 and transmitted back out through the PAMID component 212 (with signal amplification and filtering or without amplification in some case) to the plurality of relay antennas.

In accordance with an embodiment, the Tx-Rx SW 218 may be used to switch between transmitting and receiving modes and may be used in conjunction with the PA 216. The Tx-Rx SW 218 may be further configured to switch an incoming signal to one or more service phase array antennas in different directions. The BPF 220 may be configured to filter out unwanted signals (offset frequencies) that are outside of the frequency range of interest, for example, outside C-band or IF, to reduce noise and interference. The HPF 222 may be configured to filter out low-frequency signals to prevent low-frequency noise and interference from being amplified. The CPL component 224 may be used to couple the signal from the BPF 220 to the AFE 204 so that the filtered and amplified signal may be properly sent to the AFE 204. The LNA 226 may amplify the signal without adding additional noise before the signal is sent to the AFE 204 for processing.

Figure 3:
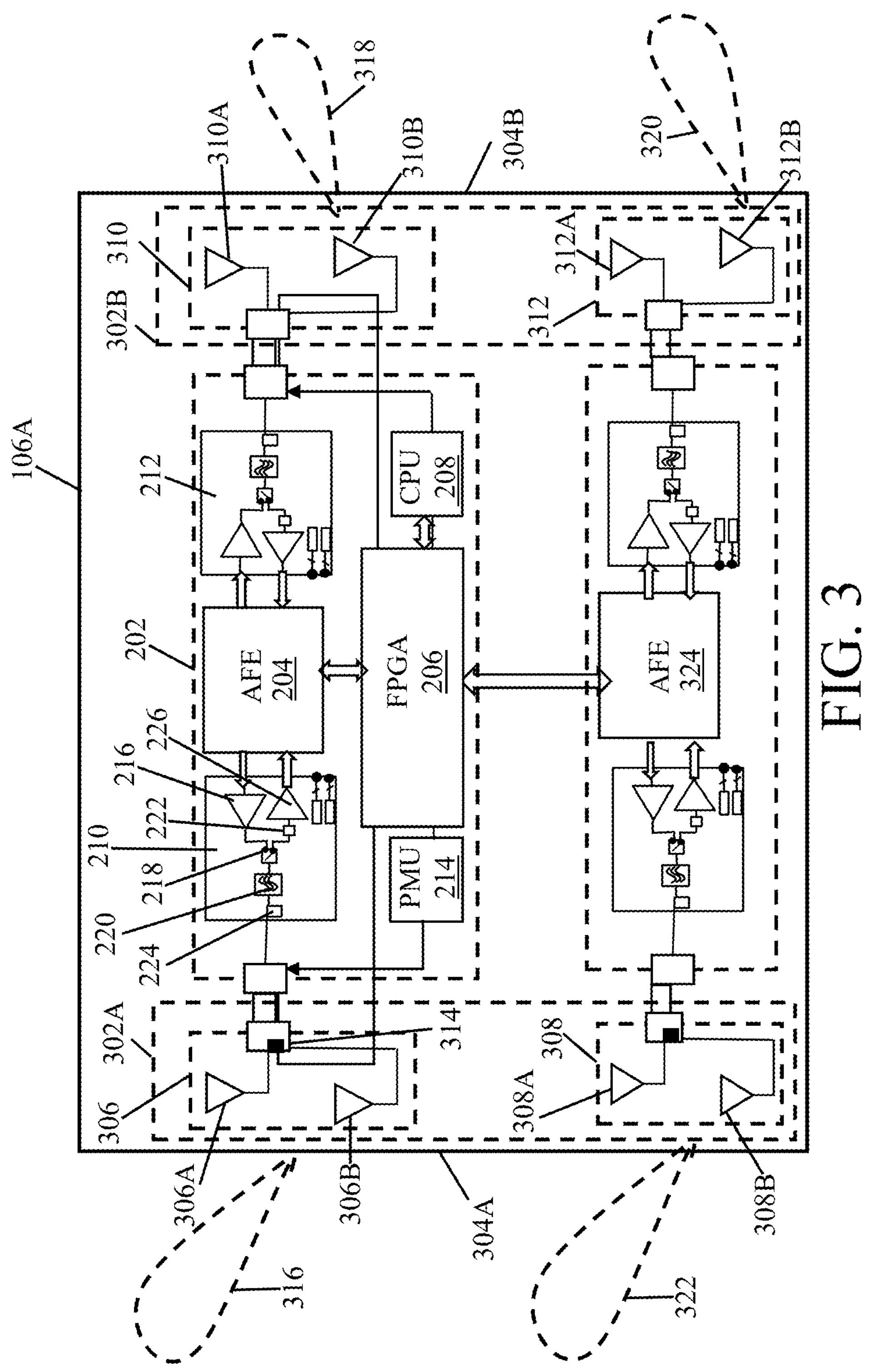
FIG. 3 is a diagram illustrating an exemplary intermediate repeater device in a wireless communication system, in accordance with an exemplary embodiment of the disclosure.

FIG. 3 is a diagram illustrating an exemplary intermediate repeater device in a wireless communication system, in accordance with an exemplary embodiment of the disclosure. FIG. 3 is explained in conjunction with elements from FIGS. 1 and 2. With reference to FIG. 3, there is shown the intermediate repeater device 106A of the plurality of intermediate repeater devices 106. The intermediate repeater device 106A may include the communication core 202 along with its components, shown and described, for example, in FIG. 2.

In this embodiment, the intermediate repeater device 106A may include a first communicating end 302A at a donor side 304A and a second communicating end 302B at a relay side 304B. The second communicating end 302B may be opposite to the first communicating end 302A. The first communicating end 302A may include a first donor antenna array 306 and a second donor antenna array 308. Each donor antenna arrays may include a number of antenna elements, for example, the first donor antenna array 306 may include a first donor antenna element 306A and a second donor antenna element 306B and the second donor antenna array 308 may include a third donor antenna element 308A and a fourth donor antenna element 308B. Moreover, the second communicating end 302B may include a first relay antenna array 310 and a second relay antenna array 312. Each of the first relay antenna array 310 and the second relay antenna array 312 may include an N-number of antenna elements. For example, the first relay antenna array 310 may include a first relay antenna element 310A and a second relay antenna element 310B and the second relay antenna array 312 may further include a third relay antenna element 312A and a fourth relay antenna element 312B.

The intermediate repeater device 106A may include a dual antenna array setup at each communicating end and each antenna array can either shift frequencies of the signal or retain frequencies, before transmitting. Furthermore, each antenna from the first donor antenna array 306, the second donor antenna array 308, the first relay antenna array 310, and the second relay antenna array 312 may be high gain dual polarized antenna, which may be beneficial to increase the bandwidth or data rate by a factor of two. In an example, each antenna from the first donor antenna array 306, the second donor antenna array 308, the first relay antenna array 310, and the second relay antenna array 312 may be a phased array antenna. In other words, instead of a standard monopole antenna, the intermediate repeater device 106A employs the phased array antenna, which may house multiple antennas (e.g., 4, 8, or more) for beamforming that focuses the signal on specific directions for improved coverage and efficiency. In an implementation, each antenna may operate in one or more of a C-band, FR1 band of 5G NR, FR2 band of 5G NR, LTE band, 6-8 GHz band, and the like. In an implementation, each antenna from the first donor antenna array 306, the second donor antenna array 308, the first relay antenna array 310, and the second relay antenna array 312 may be a phase-array antenna, an individual antenna, or other types of C-band antenna.

In an implementation, the carrier frequency of each antenna array of the first relay antenna array 310, and the second relay antenna array 312 may vary. The intermediate repeater device 106A may be configured to establish a concurrent bidirectional communication with the one or more service wireless communication devices 108 for inter-node communication through dual-link data backhaul. In an example, each network node of the wireless backhaul network 110 may be controlled or managed in a control or management plane using lower carrier frequencies (e.g., 2.4 GHz, 5 GHZ, or other sub-6 GHz frequencies) using multi-link operation of the wireless communication system 102. The communication in control or management plane may be independent of the data paths in the dual-link data backhaul.

In accordance with an embodiment, the frequency bands for each of the first donor antenna array 306, the second donor antenna array 308, the first relay antenna array 310, and the second relay antenna array 312, may be programmable, such as with a frequency of 20 MHz, 40 MHz, 80 MHZ, 160 MHZ, or 320 MHz. Therefore, based on the required bandwidth as well as the required frequency, the frequency band may be optimized. In addition, for each frequency band, the intermediate repeater device 106A may be configured to use a dual pole to double the rate of each of the first donor antenna array 306, the second donor antenna array 308, the first relay antenna array 310, and the second relay antenna array 312. In an implementation, modulation in frequency for each band including dual pole can be up to 4096. Furthermore, as the effective date rate of each antenna may also depend on the frequency band, therefore, an improved effective date rate can be achieved, (e.g., effective date rate=frequency band*2*modulation index*⅔ (MAC efficiency)). The MAC efficiency may refer to the efficiency of the Medium Access Control (MAC) layer in a communication system. The MAC layer manages access to the communication channel and may be useful for ensuring effective data transmission.

In an implementation, each of the first donor antenna array 306, the second donor antenna array 308, the first relay antenna array 310, and the second relay antenna array 312 at the second communicating end 302B of the intermediate repeater device 106A may be a dual-polarized antenna. Dual-pole antennas may efficiently double data rates, enabling the intermediate repeater device 106A to communicate, for example, at 320 MHz on each polarized antenna. While these dual-pole antennas may operate at lower frequencies, the signal may undergo up-conversion and propagation at intermediate frequency (e.g., 6-300 GHz), employing the first relay antenna array 310 and the second relay antenna array 312. Specifically, in an implementation, the phased array antennas (PAAs) with 8, 16, or 32 dual-pole arrays may be utilized to transmit and receive high-frequency mmWave signals as well as for high-frequency bands suitable for modern Wi-Fi applications. The PAA may align electromagnetic signals into a narrow beam, directing it precisely to a specific spot or area, enhancing the overall performance and focus of wireless communication. Despite the lower number of antennas, the master wireless communication device 104 still employs beamforming, which focuses a wireless signal towards a specific receiving device, rather than having the signal spread in all directions as with a traditional broadcast antenna. This increases signal strength and efficiency, reducing interference and improving overall network performance.

As the first relay antenna array 310 and the second relay antenna array 312 at the relay side 304B are dual-polarized antenna, therefore beam of each of the first relay antenna array 310 and the second relay antenna array 312 can be programmed, such as to handle different signals with different polarizations concurrently. In addition, the use of dual-polarized antennas at the relay side 304B can enhance the intermediate repeater device 106A capacity to handle a diverse set of signals, possibly improving overall communication quality. This configuration may be particularly advantageous in scenarios where the intermediate repeater device 106A may be involved in relaying signals between different locations, and the use of dual-polarized antennas adds flexibility and robustness to the wireless communication system 102. In addition, if a greater number of relay antennas are required, then each relay antenna can be connected either through the same frequency or through different frequencies.

In operation, in accordance with an embodiment, the master wireless communication device 104 may be configured to control the plurality of intermediate repeater devices 106 as well as the one or more service wireless communication devices 108 (of FIG. 1) to form the wireless backhaul network 110 in a sub-9 Gigahertz (GHz) frequency range in a defined physical area (e.g., a defined indoor area). In an example, the master wireless communication device 104 may form the wireless backhaul network 110 by establishing backhaul links with each other in the wireless backhaul mesh network configuration or a chain network configuration. In the wireless backhaul mesh network configuration, each communication device may be communicatively coupled to at least two to three neighboring network nodes. In an example, the wireless backhaul network 110 may involve the interconnection of multiple wireless communication devices, allowing each wireless communication device to communicate with each other and relay data efficiently. The use of the sub-9 GHz frequency range may be indicative of the specific spectrum within which the wireless communications may occur. Operating in the sub-9 GHz range may offer advantages, such as improved signal penetration and coverage compared to higher frequency bands.

In an implementation, the master wireless communication device 104 may be further configured to perform an environmental scan to detect existing frequency usage in the defined physical area. Thereafter, the master wireless communication device 104 may be further configured to determine a set of frequencies and bandwidths available for communication within the defined physical area within the sub-9 GHz frequency range based on the environmental scan. Firstly, the environmental scan may include scanning the radio frequency spectrum to identify frequencies that are already in use by other wireless devices or systems in the defined physical area. In an example, the scanning operation may include different steps, such as by analyzing at least one of: signals, noise levels, and other relevant factors. After the scanning operation, the master wireless communication device 104 utilizes the obtained information to determine the set of frequencies and bandwidths that are not currently in use, ensuring that the set of frequencies and bandwidths are available for communication within the defined physical area. As a result, the master wireless communication device 104 may be beneficial to optimize the selection of frequencies and bandwidths for communication within the wireless backhaul network within the sub-9 GHz frequency range based on the environmental scan. By virtue of performing the environmental scan, the master wireless communication device 104 may be aware of the existing frequency usage in the defined physical area, which may be beneficial to avoid interference with other wireless communication devices. By virtue of determining the set of available frequencies within the sub-9 GHz range, the master wireless communication device 104 minimizes the likelihood of interference, resulting in improved, reliable, and efficient wireless communication within the defined physical area. Such an adaptive approach may be useful for maintaining a stable and interference-free communication environment, especially in crowded or dynamic radio frequency scenarios.

For example, during setup, an initial Wi-Fi® spectrum analysis may be performed where existing Wi-Fi networks and their operating frequencies may be detected. The frequencies for the backhaul links that are minimally occupied may be selected, ensuring relay-to-relay (intermediate repeater device to intermediate repeater device) and access point communication doesn't interfere with existing Wi-Fi® frequencies. Wi-Fi spectrum usage may be continuously or periodically monitored and if a neighbor changes their channel or a new Wi-Fi® network pops up, the master wireless communication device 104 may control the wireless backhaul network 110 to dynamically change its frequency to maintain optimal performance.

In accordance with an embodiment, the master wireless communication device 104 may be further configured to form a dual-link data backhaul among the master wireless communication device 104, the plurality of intermediate repeater devices 106, and the one or more service wireless communication devices 108 in the frequency range of 5-8 GHz in the wireless backhaul network 110 in the defined physical area. In other words, the dual-link data backhaul may be formed in the frequency range of 5-8 GHz in the wireless backhaul network in the defined physical area, due to which the communication among the master wireless communication device 104, the plurality of intermediate repeater devices 106, and the one or more service wireless communication devices 108 occurs in a frequency range of 5-8 GHz. The master wireless communication device 104 orchestrates the formation of the dual-link data backhaul, implying that there are two channels or paths for data transfer between the master wireless communication device 104, the plurality of intermediate repeater devices 106, and the one or more service wireless communication devices 108. The dual-link data backhaul may be formed to improve data transfer and communication reliability. By virtue of forming the dual-link data backhaul, the master wireless communication device 104 can achieve redundancy and load balancing, ensuring that data can still be transferred even if one link fails. In an implementation, the master wireless communication device 104 may be configured to use the 5 GHz to 7 GHz frequency bands to form the dual-link data backhaul among the master wireless communication device 104, the plurality of intermediate repeater devices 106, and the one or more service wireless communication devices 108. The 5 GHz to 7 GHz frequency bands may be used for domestic and commercial Wi-Fi due to corresponding ability to penetrate walls and other obstructions as compared to the 60 GHz frequency, which offers improved throughput but at the expense of range and obstacle penetration. By virtue of operating in the 5 GHz to 7 GHz bands with fewer number of antennas and advanced beamforming, the master wireless communication device 104 focuses on spectrum efficiency, ensuring that the available frequency bands are used effectively without causing undue interference. By virtue of using the 5 GHz to 7 GHz bands and fewer antennas, the master wireless communication device 104 may be designed to be compatible with a wider range of devices and environments, making the master wireless communication device 104 versatile for various applications.

Alternatively, in some implementations, the master wireless communication device 104 may be further configured to form the dual-link data backhaul among the master wireless communication device 104, the plurality of intermediate repeater devices 106, and the one or more service wireless communication devices 108 in a different intermediate frequency (e.g., mmWave, 60 GHz or 7-300 GHz) different from WLAN (Wi-Fi® 7 or 8 frequencies) in the wireless backhaul network 110 in the defined physical area. In yet another implementation, the master wireless communication device 104 may be further configured to change an operating mode of the dual-link data backhaul among the master wireless communication device 104, the plurality of intermediate repeater devices 106, and the one or more service wireless communication devices 108 from a first operating mode at frequency range of 5-8 GHz to a 60 GHz mode based on a user traffic demand. The user traffic demand refers to the amount and type of data that users (UEs) request on the wireless backhaul network 110 at a given time. For example, if a large number of users are connected and actively using bandwidth-intensive applications like streaming high-definition video, online gaming, or large file downloads, the overall traffic demand may be high. To address this high user traffic demand, the wireless communication system 102 may switch to a 60 GHz operating mode or a software-defined network frequency. The 60 GHz frequency band may offer significantly wider channels compared to the 5-8 GHz band. This translates to much higher bandwidth availability. With this increased bandwidth, the wireless communication system 102 may handle the larger data demands of users, resulting in a smoother and faster experience.

In an implementation, the dual-link data backhaul formed among the master wireless communication device 104, the plurality of intermediate repeater devices 106, and the one or more service wireless communication devices 108 utilizing a multi-link operation may employ dynamic frequency shifting, beamforming, and enhanced control for efficient network management. In such an example, each intermediate repeater device may alter the Wi-Fi® signal frequency (e.g., from 5 GHz to 5.2 or 6 GHz to 6.2 GHz) or maintain the existing frequency. In another example, the frequency shifting occurs may be the frequency range of 5-8 GHz. Furthermore, as the frequency ranges from 5-8 GHz, therefore, the dual-link data backhaul can be integrated with conventional wireless access points, such as related to existing fiber, 5G, or cable networks, feeding into a modem which can be integrated with a Wi-Fi® access point.

In an implementation, the master wireless communication device 104 may be further configured to re-configure the master wireless communication device 104 and the one or more service wireless communication devices 108 to operate on the determined set of frequencies and bandwidths within the sub-9 GHz frequency range to form the dual-link data backhaul. In an example, the dual-link data backhaul may include two paths for data transfer between the master wireless communication device 104 and the one or more service wireless communication devices 108, which increases the reliability of communication. In an example, the master wireless communication device 104 may be configured to instruct the master wireless communication device 104 and the one or more service wireless communication devices 108 to adjust corresponding operating frequencies and bandwidths based on the previously determined set. In an example, such instruction may involve, sending control commands or configuration information to each service wireless communication device, instructing each service wireless communication device or each intermediate repeater device to operate on the determined set of frequencies and bandwidths within the sub-9 GHz frequency range to form the dual-link data backhaul. The configuration process ensures that the master wireless communication device 104, the plurality of intermediate repeater devices 106, and the one or more service wireless communication devices 108 may be synchronized and operate on the same set of frequencies and bandwidths, facilitating the establishment of the dual-link data backhaul. A separate backhaul management link (e.g., at 2.4 GHz or 5 GHz) other than the dual-link data backhaul may be formed to ensure control and management functions within the wireless communication system 102. By virtue of configuring the master wireless communication device 104 and the one or more service wireless communication devices 108 to operate on the predetermined set of frequencies and bandwidths, the wireless communication system 102 may establishes a reliable dual-link data backhaul, which may be beneficial from different perspectives, such as redundancy, load balancing, overall network optimization, and the like.

The master wireless communication device 104 may be further configured to form the backhaul management link among the master wireless communication device 104, the plurality of intermediate repeater devices 106, and the one or more service wireless communication devices 108 in a frequency range (e.g., sub-6 GHZ) less than the frequency range of 5-8 GHz in the wireless backhaul network 110. The backhaul management link, which may be formed in a frequency range less than the frequency range of 5-8 GHz and may also be referred to as a dedicated management link that connects and manages the communication between the master wireless communication device 104 with the plurality of intermediate repeater devices 106 and the one or more service wireless communication devices 108. For example, the backhaul management link serves to coordinate and control the overall communication within the wireless backhaul network 110, allowing the master wireless communication device 104 to efficiently manage and organize the communication activities with the plurality of intermediate repeater devices 106 and the one or more service wireless communication devices 108. The purpose of establishing the backhaul management link may be to facilitate effective coordination and control within the wireless backhaul network. The backhaul management link allows the master wireless communication device 104 to manage communication activities, such as for data routing, network optimization, and overall network management. By segregating management communication to a different frequency range, the wireless communication system 102 provides an efficient and interference-free coordination among the master wireless communication device 104, the plurality of intermediate repeater devices 106, and the one or more service wireless communication devices 108 in the wireless backhaul network.

In accordance with an embodiment, the master wireless communication device 104 and each intermediate repeater device from the plurality of intermediate repeater devices 106 may be further configured to concurrently perform a transmit operation (Tx) and receive operation (Rx) at different frequency bands with a neighboring network node via the dual-link data backhaul. For example, the master wireless communication device 104 may be configured to transmit signals at "RF1", such as 6 GHz and receive signals at "RF4", such as 7 GHz. Each intermediate repeater device (i.e., each relay) may receive at "RF1" (e.g. a first RF carrier signal 316 at 6 GHz) and transmit at "RF2" (e.g., a second RF carrier signal 318 at 6.2 GHz) for the download operation for downstream communication and receive at "RF3" (e.g., a third RF carrier signal 320 at 6.8 GHz) and transmit at "RF4" (e.g., a fourth RF carrier signal 322 at 7 GHZ) for the upload operation for upstream communication. Lastly, the service wireless communication device (i.e. the service AP) may be configured to transmit at "RF3" (e.g., the third RF carrier signal 320 at 6.8 GHZ) and receive at "RF2" (e.g., the second RF carrier signal 318 at 6.2 GHZ). This serves to isolate all the signals and prevent the feedback loop that would normally occur if RF2 leaked back. Since the leaked RF2 would now be outside the filter's passband, it may be effectively attenuated, helping prevent oscillation. For example, if RF1=6 GHZ, offset (Delta F) may be 200 MHz: This would lead to RF2=6.2 GHz, i.e., 200 MHz, likely outside filter bandwidth. Different frequency bands for the transmit operation and the receive operation are beneficial to optimize bandwidth utilization, reducing the likelihood of interference and improving overall network performance.

In an implementation, the intermediate repeater device 106A may be configured to control the configuration and frequency shifting of each antenna from the first donor antenna array 306, the second donor antenna array 308, the first relay antenna array 310, and the second relay antenna array 312 based on a selected frequency band. In an example, antenna configuration and frequency shifting for each of the first donor antenna array 306, the second donor antenna array 308, the first relay antenna array 310, and the second relay antenna array 312 can be controlled by a local controller, such as the FPGA 206, the master wireless communication device 104 or remotely from the central cloud server 120 based on a selected frequency band. Furthermore, as each of the first relay antenna array 310, and the second relay antenna array 312 may be dual-polarized antennas, therefore, each relay antenna may use dual-polarization, which allows each relay antenna to transmit and receive signals on two different polarities concurrently, effectively doubling the link capacity without requiring additional spectrum.

The intermediate repeater device 106A may be configured to receive, from the upstream network node via the first donor antenna array 306, the first RF carrier signal 316 in a first frequency (e.g., 6 GHZ) carrying a download data stream. In an example, the first RF carrier signal 316 may be received in the first frequency (RF1) carrying a download data stream from the master wireless communication device 104 at the first communicating end 302A. In this implementation, the first donor antenna array 306 may be configured to operate at the first frequency. The first frequency may be selected from a first frequency band (i.e., RF1 band), which represents a frequency band for the incoming download data stream through the first RF carrier signal 316 and towards the communication core 202 of the intermediate repeater device 106A. The first frequency band may range from 5-8 GHZ, such as the first frequency may be 6 GHz. By virtue of designating the first frequency for the incoming data streams from the first donor antenna array 306, the intermediate repeater device 106A avoids interference from incoming signals in other frequency bands, which ensures a clear and reliable channel for the download data stream. Thereafter, the intermediate repeater device 106A may be configured to configure the first relay antenna array 310 to operate at the second frequency. In such implementation, the second frequency may be selected from a second frequency band, which represents the frequency band for outgoing signals from the communication core 202 (i.e., downstream data link) of the intermediate repeater device 106A, via the second RF carrier signal 318. Thereafter, each intermediate repeater device may be further configured may be configured to relay, via the first relay antenna array 310, the download data stream in the second RF carrier signal 318 at a second frequency to a downstream network node. The second frequency may be a first offset (e.g., 200 MHz offset of the first frequency). In an implementation, if the downstream network node may be a downstream intermediate repeater device of the plurality of intermediate repeater devices 106, then the intermediate repeater device 106A may be configured to relay the download data stream in the second RF carrier signal at the second frequency from the first relay antenna array 310 to the downstream intermediate repeater device. In another example, if the downstream network node may be the first service wireless communication device 108A of the one or more service wireless communication devices 108B, then the intermediate repeater device 106A may be configured to relay the download data stream in the second RF carrier signal 318 at the second frequency (e.g., 6.2 GHz) from the first relay antenna array 310 to the first service wireless communication device 108A. In an example, the second frequency band may range from 5 GHz to 8 GHZ, such as the second frequency may be 6.2 GHz. In another implementation, when the first frequency is 5 GHZ, then the second frequency may be 5.2 GHz, which may be the first offset of the first frequency, such as 0.2 an offset value for the second frequency. The use of distinct frequencies (i.e., the first frequency and the second frequency) for incoming and outgoing signals may be beneficial to prevent interference between the uplink and downlink communications. By virtue of configuring the first relay antenna array 310 to operate at the second frequency allows the intermediate repeater device 106A to have a dedicated downlink frequency for transmitting signals to the first service wireless communication device 108A, which may be beneficial to improve the efficiency and reliability of downlink communication. In addition, the use of the second frequency as the first offset of the first frequency introduces frequency diversity within the downlink communication, which may be advantageous for mitigating interference and improving the robustness of the wireless communication system 102.

The intermediate repeater device 106A (e.g., the FPGA 206) may be further configured to configure the second relay antenna array 312 to operate at the third frequency. In such implementation, the third frequency may be selected from a third frequency band, which may represent a different frequency band for incoming signals (uplink) for the communication core 202 of the intermediate repeater device 106A, such as through the third RF carrier signal 320. In an example, the third frequency band may range from 5 GHz to 8 GHz, such as the third frequency may be 5 GHz. Thereafter, the intermediate repeater device 106A may be configured to receive the third RF carrier signal 320 carrying an upload data stream in the third frequency (e.g., 5 GHZ) though the second relay antenna array 312 at the second communicating end 302B. By virtue of configuring the second relay antenna array 312 to operate at the third frequency in a different frequency band, the intermediate repeater device 106A introduces frequency diversity. The third frequency may be beneficial to improve the robustness of the wireless communication system 102, such as in certain environments where certain frequency bands may be affected by interference or congestion.

The intermediate repeater device 106A may be configured to configure the second donor antenna array 308 to operate at the fourth frequency. In such implementation, the fourth frequency may be selected from a fourth frequency band, which corresponds to the outgoing signals for the uplink, such as through the fourth RF carrier signal 322. In an example, the fourth frequency band may range from 5 GHz to 8 GHz, such as the fourth frequency may be 5.2 GHz. Thereafter, the intermediate repeater device 106A may be configured to communicate the upload data stream in the fourth RF carrier signal 322 in the fourth frequency from the second donor antenna array 308 to the upstream network node, and through the first communicating end 302A. The fourth frequency may be a second offset of the third frequency. In an implementation, when the third frequency is 5 GHZ, then the fourth frequency may be 5.2 GHz, which may be the second offset of the third frequency, such as 0.2 may be an offset value for the fourth frequency. The use of the fourth frequency as the second offset of the third frequency introduces frequency diversity within the uplink communication, which may be advantageous for mitigating interference and improving the robustness of the wireless communication system 102. Moreover, if the upstream network node may be the master wireless communication device 104, then the intermediate repeater device 106A may be configured to communicate the upload data stream in the fourth RF carrier signal from the second donor antenna array 308 to the master wireless communication device 104. In another example, if the upstream network node may be an upstream intermediate repeater device of the plurality of intermediate repeater devices 106, then the intermediate repeater device 106A may be configured to communicate the upload data stream in the fourth RF carrier signal 322 from the second donor antenna array 308 to the upstream intermediate repeater device. Therefore, the intermediate repeater device 106A provides flexibility in defining the upstream communication pathways based on the upstream network node type. In addition, whether the upstream node may be the master wireless communication device 104 or the upstream intermediate repeater device, the intermediate repeater device 106A adapts its configuration, allowing for versatile communication routes.

In accordance with an embodiment, the master wireless communication device 104 may be configured to periodically monitor a user demand at a plurality of different sub-areas distributed in the defined physical area using the one or more service wireless communication devices 108. The master wireless communication device 104 may be further configured to determine an increase in the user demand at the first sub-area and a decrease in the user demand at the second sub-area of the plurality of different sub-areas. Based on the user demand, the master wireless communication device 104 may be further configured to control the direction of the beam for high-gain transmission and allows for polarization control, ensuring efficient signal propagation at the plurality of different sub-areas. Therefore, based on the increase in the user demand at the first sub-area, the master wireless communication device 104 may be configured to execute an on-demand load balancing by directing one or more focused beams of RF signals with an increased data throughput capacity (e.g., mmWave signals like 60 GHz) to a crowded area from the plurality of different sub-areas. This dynamic load balancing strategy optimizes network resources by efficiently allocating higher data throughput where required, ensuring that crowded areas receive ample bandwidth while conserving resources in less-crowded areas (e.g., 5 GHz or 6 GHZ), ultimately enhancing network performance and user satisfaction.

In accordance with an embodiment, the master wireless communication device 104 may be configured to adjust network resources including an allocation of a number of service wireless communication devices and an allocation a frequency band and bandwidth such that first sub-area may be allocated more network resources as compared to the second sub-area. For example, if the first sub-area is a crowded area with a high concentration of the UEs, while the second sub-area is with a low concentration of the UEs. Therefore, in such case, the master wireless communication device 104 may be configured to allocate the high number of service wireless communication devices (e.g., three devices), high frequency bands (e.g., at least three frequency bands), and bandwidth in the first sub-area. However, the master wireless communication device 104 may be configured to allocate the less number service wireless communication devices, lesser frequency bands, and bandwidths in the second sub-area. As a result, the master wireless communication device 104 may be configured to control the high number of service wireless communication devices in the first sub-area, to direct the one or more focused beams of the RF signals to ensure that each UE in the first sub-area experience optimal data speeds (40-100 GBPS) and improved network performance at improved throughput. Conversely, in the second sub-area with less number UEs, the use of the wider beams with a lower data throughput capacity may ensure that network resources are not wasted, thereby conserving bandwidth and increasing overall network efficiency. This on-demand load balancing approach may lead to improved user experiences in crowded areas and resource optimization in less-crowded zones, enhancing network performance overall.

In accordance with an embodiment, the master wireless communication device 104 may be further configured to periodically monitor a network traffic pattern including an interference level, a download traffic pattern, and an upload traffic pattern associated with the dual-link data backhaul at each of the one or more service wireless communication device 108. The periodic monitoring of the network traffic pattern, including interference levels, download traffic patterns, and upload traffic patterns associated with the dual-link data backhaul at each service wireless communication device, enables dynamic optimization of the wireless backhaul network 110, which may be a wireless RF mesh network. Thereafter, the master wireless communication device 104 may be configured to adjust a network setting and an antenna setting at the master wireless communication device 104 and each of the one or more service wireless communication device in response to a change in the network traffic pattern. In addition, by virtue of assessing interference levels, the master wireless communication device 104 may take proactive measures to mitigate the interference, such as adjusting the frequency, optimizing transmission power, or reconfiguring corresponding service wireless communication devices to avoid congested frequency bands.

Beneficially, each intermediate repeater device of the plurality of intermediate repeater devices 106 of the wireless communication system 102 improves standard radio tuning, which employs advanced approaches for signal phase and frequency adjustment, enabling effective beamforming. Furthermore, due to the formation of the wireless backhaul network 110, the wireless communication system 102 acts as a backbone for ethernet in certain areas, meshing signals together for a robust network infrastructure. Furthermore, by virtue of using the frequency range from 5-8 GHz in the wireless backhaul network, the wireless communication system 102 can achieve an improved data rate with integrated routing and switching. In an example, by leveraging multi-user MIMO technology, the master wireless communication device 104 (e.g., Wi-Fi 7 system) can handle high data rates and perform routing and switching tasks, potentially eliminating the need for separate routers and switches. Therefore, each intermediate repeater device of the plurality of intermediate repeater devices 106 of the wireless communication system 102 represents a significant leap in wireless networking, contributing improved efficiency, advanced control, and robust data handling capabilities.

Figure 4C:
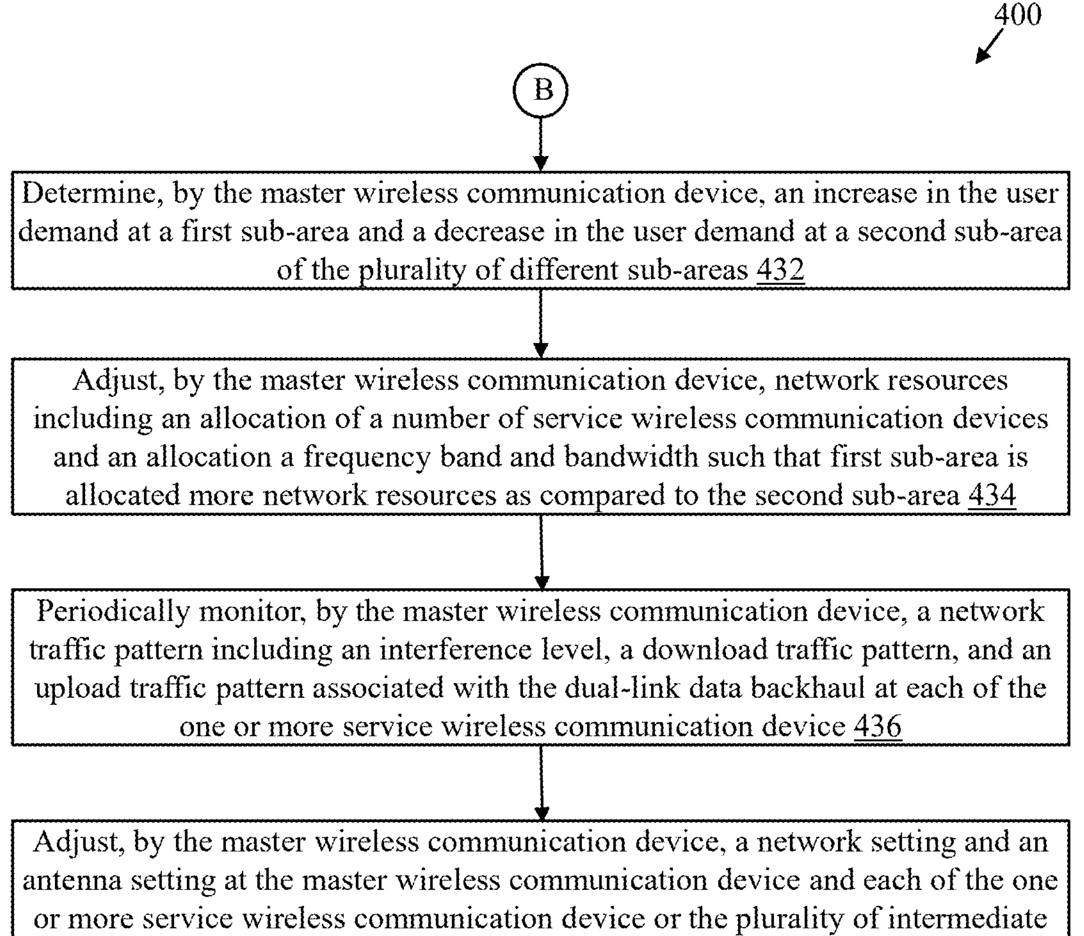

FIGS. 4A, 4B, and 4C, collectively, is a flowchart that illustrates an exemplary method of wireless communication, in accordance with an embodiment of the disclosure. With reference to FIGS. 4A, 4B, and 4C, there is shown a flowchart that illustrates a method 400 of wireless communication. The method 400 includes operations 402 to 436. The method 400 may be implemented in the wireless communication system 102 (FIG. 1).

At 402, the master wireless communication device 104 may communicate with the data source 112 and one of the plurality of intermediate repeater devices 106. In an implementation, the master wireless communication device 104 (from the master access point's (AP's) perspective) may be responsible for downloading and uploading data for example, with the data source 112. In an example, the FPGA 206 along with the CPU 208 may be used for managing the communication between the master wireless communication device 104 to the data source 112 and one of the plurality of intermediate repeater devices 106.

At 404, each of the plurality of intermediate repeater devices 106 may communicate with an upstream network node and a downstream network node. The upstream network node may be one of the master wireless communication device 104 or an upstream intermediate repeater device of the plurality of intermediate repeater devices 106. The downstream network node may be one of a downstream intermediate repeater device of the plurality of intermediate repeater devices 106 or the first service wireless communication device 108A of the one or more service wireless communication devices 108.

At 406, the one or more service wireless communication devices may communicate with the one or more intermediate repeater devices of the plurality of intermediate repeater devices 106 and the one or more UEs 118. In an implementation, the one or more UEs 118 present in the wireless backhaul network 110. Each service wireless communication device may be strategically deployed to meet specific network requirements, which ensures that each service wireless communication device may be tailored to optimize performance, coverage, and functionality, making each network node highly adaptable to various use cases and evolving network needs.

At 408, the plurality of intermediate repeater devices 106 and the one or more service wireless communication devices 108 may be controlled by the master wireless communication device 104 to form a wireless radio frequency (RF) mesh network in a sub-9 Gigahertz (GHz) frequency range in a defined physical area. The master wireless communication device 104 may form the wireless backhaul mesh network or a wireless backhaul chain network by establishing backhaul links with each other in the wireless backhaul network configuration or a chain network configuration. In the wireless backhaul network configuration, each communication device may be communicatively coupled to at least two to three neighboring communication devices. The use of the sub-9 GHz frequency range may indicate the specific spectrum within which the wireless communications occur. Operating in the sub-9 GHz range may offer advantages, such as improved signal penetration and coverage compared to higher frequency bands.

At 410, an environmental scan may be performed by the master wireless communication device 104 to detect existing frequency usage in the defined physical area.

At 412, a set of frequencies and bandwidths available for communication within the defined physical area within the sub-9 GHz frequency range may be determined by the master wireless communication device 104, based on the environmental scan. By performing the environmental scan, the master wireless communication device 104 may be aware of the existing frequency usage in the defined physical area, which may be beneficial to avoid interference with other wireless communication devices.

At 414, a dual-link data backhaul may be formed by the master wireless communication device 104 among the master wireless communication device 104, the plurality of intermediate repeater devices 106, and the one or more service wireless communication devices 108 in a frequency range of 5-8 GHz in the wireless backhaul network. The master wireless communication device 104 orchestrates the formation of the dual-link data backhaul, in which there may be paths for data transfer among the master wireless communication device 104, the plurality of intermediate repeater devices 106, and the one or more service wireless communication devices 108. The dual-link data backhaul provides redundancy and load balancing, ensuring that data can still be transferred even if one link fails. In an implementation, the master wireless communication device 104 may be configured to use the 5 GHz to 7 GHz frequency bands to form the dual-link data backhaul among the master wireless communication device 104, the plurality of intermediate repeater devices 106, and the one or more service wireless communication devices 108.

At 416, the master wireless communication device 104 and the one or more service wireless communication devices 108 may be re-configured by the master wireless communication device 104 to operate on the determined set of frequencies and bandwidths within the sub-9 GHz frequency range to form the dual-link data backhaul. In an example, the dual-link data backhaul includes two paths for data transfer between the master wireless communication device 104 and the one or more service wireless communication devices 108, which increases the reliability of communication.

At 418, a backhaul management link may be formed by the master wireless communication device 104 among the master wireless communication device 104, the plurality of intermediate repeater devices 106, and the one or more service wireless communication devices 108 in a frequency range less than the frequency range of 5-8 GHz in the wireless backhaul network. The backhaul management link, which may be formed in a frequency range less than the frequency range of 5-8 GHz and may also be referred to as a dedicated management link that connects and manages the communication links between the master wireless communication device 104 with the one or more service wireless communication devices 108. For example, the backhaul management link serves to coordinate and control the overall communication within the wireless backhaul network, allowing the master wireless communication device 104 to efficiently manage and organize the communication activities with the one or more service wireless communication devices 108. The purpose of establishing the backhaul management link may be to facilitate effective coordination and control within the wireless backhaul network. By segregating management communication to a different frequency range, the wireless communication system 102 provides an efficient and interference-free coordination among the master wireless communication device 104 and the one or more service wireless communication devices 108 in the wireless backhaul network.

At 420, a transmit operation (Tx) and receive operation (Rx) may be concurrently performed by the master wireless communication device 104 with a neighboring network node and each repeater device from the plurality of intermediate repeater devices 106, at different frequency bands via the dual-link data backhaul.

In an implementation, the intermediate repeater device 106A may be configured to control the configuration and frequency shifting of each antenna from the first donor antenna array 306, the second donor antenna array 308, the first relay antenna array 310, and the second relay antenna array 312 based on a selected frequency band.

At 422, the first RF carrier signal 316 in a first frequency (e.g., RF1) carrying a download data stream may be received by each intermediate repeater device from the upstream network node. In an example, the first RF carrier signal 316 may be received from the master wireless communication device 104 via the first donor antenna array 306 at the first communicating end 302A of the intermediate repeater device 106A.

At 424, the download data stream may be relayed by each intermediate repeater device in the second RF carrier signal 318 at a second frequency (e.g., RF2) to the downstream network node, where the second frequency may be a first offset of the first frequency. The use of distinct frequencies (i.e., the first frequency and the second frequency) for incoming and outgoing signals may be beneficial to prevent interference between the uplink and downlink communications.

At 426, the third RF carrier signal 320 carrying an upload data stream in a third frequency (e.g., RF3) may be received by each intermediate repeater device, from the downstream network node.

At 428, the upload data stream may be communicated in the fourth RF carrier signal 322 in a fourth frequency (e.g., RF4) to the upstream network node, where the fourth frequency may be a second offset of the third frequency.

At 430, a user demand may be periodically monitored by the master wireless communication device 104, at a plurality of different sub-areas distributed in the defined physical area using the one or more service wireless communication devices 108.

At 432, an increase in the user demand may be determined by the master wireless communication device 104 at a first sub-area and a decrease in the user demand at a second sub-area of the plurality of different sub-areas. Based on the increase in the user demand at the first sub-area, the master wireless communication device 104 may be configured to execute an on-demand load balancing by directing one or more focused beams of RF signals with an increased data throughput capacity to a crowded area from the plurality of different sub-areas. This dynamic load balancing strategy optimizes network resources by efficiently allocating higher data throughput where required, ensuring that crowded areas receive ample bandwidth while conserving resources in less-crowded areas, ultimately enhancing network performance and user satisfaction.

At 434, network resources may be adjusted by the master wireless communication device 104, including an allocation of a number of service wireless communication devices and an allocation a frequency band and bandwidth such that first sub-area may be allocated more network resources as compared to the second sub-area. For example, the first sub-area may be a crowded area with a high concentration of the UEs, while the second sub-area may have a low concentration of the UEs. In such a case, the master wireless communication device 104 may be further configured to allocate a higher number of service wireless communication devices high frequency bands, and bandwidth in the first sub-area, whereas comparatively less number service wireless communication devices, lesser frequency bands, and bandwidths maybe allocated for the second sub-area. This on-demand load optimization may lead to improved user experiences in crowded areas and resource optimization in less-crowded zones, enhancing network performance overall.

At 436, a network traffic pattern including an interference level, a download traffic pattern, and an upload traffic pattern associated with the dual-link data backhaul at each of the one or more service wireless communication devices 108, may be periodically monitored by the master wireless communication device 104. By assessing interference levels, the master wireless communication device 104 can take proactive measures to mitigate the interference, such as adjusting the frequency, optimizing transmission power, or reconfiguring corresponding service wireless communication devices to avoid congested frequency bands.

At 438, a network setting and an antenna setting may be adjusted by the master wireless communication device 104, at the master wireless communication device 104 and each of the one or more service wireless communication devices 108 or the plurality of intermediate repeater devices 106 in response to a change in the network traffic pattern.

Various embodiments of the disclosure may provide the wireless communication system 102 (FIG. 1). The wireless communication system 102 includes the master wireless communication device 104 configured to communicate with the data source 112 and one of a plurality of intermediate repeater devices 106. The wireless communication system 102 further includes the plurality of intermediate repeater devices 106, wherein each of the plurality of intermediate repeater devices 106 may be configured to communicate with an upstream network node and a downstream network node. The wireless communication system 102 further includes one or more service wireless communication devices 108 configured to communicate with one or more intermediate repeater devices and one or more UEs 118. Each intermediate repeater device of the plurality of intermediate repeater devices 106 may comprise the first communicating end 302A at the donor side 304A and the second communicating end 302B at the relay side 304B opposite the first communicating end 302A, and wherein the first communicating end 302A comprises the first donor antenna array 306 and the second donor antenna array 308 and the second communicating end 302B comprises the first relay antenna array 310 and the second relay antenna array 312. Each intermediate repeater device may be further configured to receive, from the upstream network node via the first donor antenna array 306, the first RF carrier signal 316 in a first frequency carrying a download data stream and relay, via the first relay antenna array 310, the download data stream in the second RF carrier signal 318 at a second frequency to a downstream network node, wherein the second frequency may be a first offset of the first frequency. Each intermediate repeater device may be further configured to receive, from the downstream network node via the second relay antenna array 312, the third RF carrier signal 320 carrying an upload data stream in a third frequency, and communicate, via the second donor antenna array 308, the upload data stream in the fourth RF carrier signal 322 in a fourth frequency to the upstream network node, wherein the fourth frequency may be a second offset of the third frequency.

Various embodiments of the disclosure may provide a non-transitory computer-readable medium having stored thereon, computer implemented instructions that when executed by a computer causes a communication system to execute operations, the operations comprising communicating, by the master wireless communication device 104, with the data source 112 and one of a plurality of intermediate repeater devices 106. The operations further comprise communicating, by each of the plurality of intermediate repeater devices 106, with upstream network node and a downstream network node. The operations further comprise communicating, by one or more service wireless communication devices 108, with one or more intermediate repeater devices and one or more UEs 118. The operations further comprise receiving, by each intermediate repeater device, the first RF carrier signal 316 in a first frequency carrying a download data stream from the upstream network node and relaying the download data stream in the second RF carrier signal 318 at a second frequency to a downstream network node, wherein the second frequency is a first offset of the first frequency. The operations further comprise receiving, by each intermediate repeater device, the third RF carrier signal 320 carrying an upload data stream in a third frequency from the downstream network node and communicating the upload data stream in the fourth RF carrier signal 322 in a fourth frequency to the upstream network node, wherein the fourth frequency is a second offset of the third frequency.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods described herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" may be any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication system, comprising:

a master wireless communication device configured to communicate with a data source and one of a plurality of intermediate repeater devices;

the plurality of intermediate repeater devices, wherein each of the plurality of intermediate repeater devices is configured to communicate with an upstream network node and a downstream network node; and one or more service wireless communication devices configured to communicate with one or more intermediate repeater devices of the plurality of intermediate repeater devices and one or more user equipment (UEs), wherein each intermediate repeater device of the plurality of intermediate repeater devices comprises a first communicating end at a donor side and a second communicating end at a relay side opposite the first communicating end, wherein the first communicating end comprises a first donor antenna array and a second donor antenna array, and the second communicating end comprises a first relay antenna array and a second relay antenna array, and wherein the each intermediate repeater device is further configured to:

receive, from the upstream network node via the first donor antenna array, a first RF carrier signal in a first frequency carrying a download data stream;

relay, via the first relay antenna array, the download data stream in a second RF carrier signal at a second frequency to the downstream network node, wherein the second frequency is a first offset of the first frequency;

receive, from the downstream network node via the second relay antenna array, a third RF carrier signal carrying an upload data stream in a third frequency; and communicate, via the second donor antenna array, the upload data stream in a fourth RF carrier signal in a fourth frequency to the upstream network node, wherein the fourth frequency is a second offset of the third frequency.

2. The wireless communication system according to claim 1, wherein the upstream network node is one of: the master wireless communication device or an upstream intermediate repeater device of the plurality of intermediate repeater devices, and wherein the downstream network node is one of: a downstream intermediate repeater device of the plurality of intermediate repeater devices or a service wireless communication device of the one or more service wireless communication devices.

3. The wireless communication system according to claim 1, wherein the master wireless communication device is configured to control the plurality of intermediate repeater devices and the one or more service wireless communication devices to form a wireless backhaul network in a sub-9 Gigahertz (GHz) frequency range in a defined physical area.

4. The wireless communication system according to claim 3, wherein the master wireless communication device is further configured to:

form a dual-link data backhaul among the master wireless communication device, the plurality of intermediate repeater devices and the one or more service wireless communication devices in a frequency range of 5-8 GHz in the wireless backhaul network in the defined physical area; and form a backhaul management link among the master wireless communication device, the plurality of intermediate repeater devices, and the one or more service wireless communication devices in a frequency range less than the frequency range of 5-8 GHz in the wireless backhaul network.

5. The wireless communication system according to claim 4, wherein the master wireless communication device and each of the plurality of intermediate repeater devices are further configured to concurrently perform a transmit operation (Tx) and receive operation (Rx) at different frequency bands with a neighboring network node via the dual-link data backhaul.

6. The wireless communication system according to claim 4, wherein the master wireless communication device is further configured to:

perform an environmental scan to detect existing frequency usage in the defined physical area; and determine a set of frequencies and bandwidths available for communication within the defined physical area within the sub-9 GHz frequency range based on the environmental scan.

7. The wireless communication system according to claim 6, wherein the master wireless communication device is further configured to re-configure the master wireless communication device and the one or more service wireless communication devices to operate on the determined set of frequencies and bandwidths within the sub-9 GHz frequency range to form the dual-link data backhaul.

8. The wireless communication system according to claim 1, wherein the master wireless communication device is further configured to periodically monitor a user demand at a plurality of different sub-areas distributed in a defined physical area using the one or more service wireless communication devices.

9. The wireless communication system according to claim 8, wherein the master wireless communication device is further configured to determine an increase in the user demand at a first sub-area and a decrease in the user demand at a second sub-area of the plurality of different sub-areas.

10. The wireless communication system according to claim 9, wherein the master wireless communication device is further configured to adjust network resources including an allocation of the one or more service wireless communication devices and an allocation of a frequency band and a bandwidth such that the first sub-area is allocated more network resources as compared to the second sub-area.

11. The wireless communication system according to claim 1, wherein the master wireless communication device is further configured to periodically monitor a network traffic pattern including an interference level, a download traffic pattern, and an upload traffic pattern associated with a dual-link data backhaul at each of the one or more service wireless communication devices.

12. The wireless communication system according to claim 11, wherein the master wireless communication device is further configured to adjust a network setting and an antenna setting at the master wireless communication device and each of the one or more service wireless communication devices or the plurality of intermediate repeater devices in response to a change in the network traffic pattern.

13. The wireless communication system according to claim 1, wherein each of the master wireless communication device and the one or more service wireless communication devices is one of: a wireless access point (WAP), a fixed wireless access (FWA) device, or a wireless local area network (WLAN) based mesh node.

14. The wireless communication system according to claim 1, wherein each of the first donor antenna array, the second donor antenna array, the first relay antenna array, and the second relay antenna array is a dual-polarized antenna.

15. A method of wireless communication, the method comprising:

communicating, by a master wireless communication device, with a data source and one of a plurality of intermediate repeater devices;

communicating, by each intermediate repeater device of the plurality of intermediate repeater devices, with an upstream network node and a downstream network node;

communicating, by one or more service wireless communication devices, with one or more intermediate repeater devices of the plurality of intermediate repeater devices and one or more user equipment (UEs);

receiving, by the each intermediate repeater device, a first radio frequency (RF) carrier signal in a first frequency carrying a download data stream from the upstream network node and relaying the download data stream in a second RF carrier signal at a second frequency to the downstream network node, wherein the second frequency is a first offset of the first frequency; and receiving, by the each intermediate repeater device, a third RF carrier signal carrying an upload data stream in a third frequency from the downstream network node and communicating the upload data stream in a fourth RF carrier signal in a fourth frequency to the upstream network node, wherein the fourth frequency is a second offset of the third frequency.

16. The method according to claim 15, wherein the upstream network node is one of: the master wireless communication device or an upstream intermediate repeater device of the plurality of intermediate repeater devices, and wherein the downstream network node is one of: a downstream intermediate repeater device of the plurality of intermediate repeater devices or a service wireless communication device of the one or more service wireless communication devices.

17. The method according to claim 15, further comprising controlling, by the master wireless communication device, the plurality of intermediate repeater devices and the one or more service wireless communication devices to form a wireless backhaul network in a sub-9 Gigahertz (GHz) frequency range in a defined physical area.

18. The method according to claim 17, further comprising:

forming, by the master wireless communication device, a dual-link data backhaul among the master wireless communication device, the plurality of intermediate repeater devices and the one or more service wireless communication devices in a frequency range of 5-8 GHz in the wireless backhaul network in the defined physical area; and forming, by the master wireless communication device, a backhaul management link among the master wireless communication device, the plurality of intermediate repeater devices, and the one or more service wireless communication devices in a frequency range less than the frequency range of 5-8 GHz in the wireless backhaul network.

19. The method according to claim 18, further comprising concurrently performing, by the master wireless communication device and each of the plurality of intermediate repeater devices, a transmit operation (Tx) and receive operation (Rx) at different frequency bands with a neighboring network node via the dual-link data backhaul.

20. A computer program product for wireless communication, the computer program product comprising a computer-readable storage medium having program instructions embodied therewith, the program instructions being executable by a system to cause the system to execute operations, the operations comprising:

communicating, by a master wireless communication device, with a data source and one of a plurality of intermediate repeater devices;

communicating, by each intermediate repeater device of the plurality of intermediate repeater devices, with an upstream network node and a downstream network node;

communicating, by one or more service wireless communication devices, with one or more intermediate repeater devices of the plurality of intermediate repeater devices and one or more user equipment (UEs);

receiving, by the each intermediate repeater device, a first radio frequency (RF) carrier signal in a first frequency carrying a download data stream from the upstream network node and relaying the download data stream in a second RF carrier signal at a second frequency to the downstream network node, wherein the second frequency is a first offset of the first frequency; and receiving, by the each intermediate repeater device, a third RF carrier signal carrying an upload data stream in a third frequency from the downstream network node and communicating the upload data stream in a fourth RF carrier signal in a fourth frequency to the upstream network node, wherein the fourth frequency is a second offset of the third frequency.

* * * * *